Patented May 30, 1944

2,349,969

UNITED STATES PATENT OFFICE 2,349,969

PROCESS OF SEPARATING ALBUMINOUS PRODUCTS FROM MILK GOOD FOR BEATING AND BAKING

Karl Kremers, Stuttgart, Germany; vested in the Alien Property Custodian

No Drawing. Application February 18, 1939, Serial No. 257,240. In Germany February 21, 1938

8 Claims. (Cl. 99—57)

There are different processes of producing albumin from milk. For instance albumin is precipitated by employing heat and chemicals. But in this well known process albumin is considerably reduced in value as it is obtained by precipitation in irreversible state (may be under the influence of heat or by chemical reaction) which results in loss of those qualities of albumin which are good for beating and baking. Accordingly albumin is limited in use.

This invention leads to a process which separates the albumin contents from milk in such a state that an albuminous product is produced which is good for beating and baking. For this purpose the pH-value of the albuminous contents of milk is elevated up to more than 7 and then water from the solution treated in this manner is removed at a temperature that prevents any detrimental influence of heat on colloids of albumin. The degree of temperature depends in a certain way on the concentration of albumin and the special kind of albumin or proteins and may be ascertained in any case. Generally, temperature is beneath 60° C.

This process may be employed either by separating albumin from whey or casein from skim milk. An albuminous product of excellent qualities for beating and baking is obtained from a mixture of skim milk with whey.

Water of solution may be removed either by separators or by evaporating if the points of view mentioned above are taken in consideration.

The practical execution of the process is described in the following.

In order to obtain an albuminous product from whey, first this whey is cleaned by removing slime. Then the pH value is raised to more than 7 by adding alkaline materials, without heating up, at low temperature. By this, albumin of whey is changed over to particles which are good for beating and baking. This process may be assisted by simultaneous influence of electric current giving an opalescent precipitate of albumin in medium of dispersion. Product treated in the described manner is removed from the medium of dispersion up to the desired dry content at a temperature which prevents any detrimental influence on colloids.

Concentration of albumin by separating the solvent may be done advantageously in separators. The time of reaction should be fixed in a way that removing of water up to a dry content of 6–12% and the following drying process for instance in a spray-drying-chamber are finished before the albumin, obtained by changing pH, begins to redissolve.

Example I

Purified whey in a continuous flow of liquid is treated with ammonia in gaseous form, supplied in a quantity which is in proportion to the quantity of whey running through. The quantity of supplied ammonia has to give an increase of pH value over 7. At the same time or before or after this, an electric current, preferably alternating current, takes influence on medium of dispersion. The medium of dispersion after treatment has the character of an opalescent precipitate which represents a reversible precipitation as it disappears by returning to the original pH value.

It is proven as a fact that the well known methods of settling and filtration are not satisfactory. In settling the opalescent liquid albumin is in contact with medium of dispersion for a too long time. On account of its reversible character the opalescent precipitate may return to the original state of solution. By filtration of the opalescent precipitate pressure will denature the colloid of albumin for the desired use.

In contrary to this these disadvantages are avoided by concentrating albumin with separators.

I have found it best to concentrate liquid up to 6–12% dry content and that higher concentrating will denature albumin by pressure. According to this described example opalescent albumin suspension runs into a nozzle separator and leaves it for instance with a concentration of about 8% dry contents.

In order to dry this liquid, spray-drying-chambers have proven best. Drying in contact-drying chambers is detrimental to a certain degree for albumin. Therefore concentrated albumin coming out of the separator runs into a spray-drying-chamber in which water is totally removed from albumin.

In order to obtain a large gain of dry substance with this method, it is possible to raise a quantity of concentrated liquid, which contains the opalescent albumin precipitate, at the cost of cleared liquid leaving the separator in such a way that a part of the non-proteins and a part of the rest-proteins being in solution get into the dry substance. By this, not only the quantity of the separated dry substance will increase but also a product is obtained which is better for several purposes than pure albumin for instance on account of its content of sugar. This product is just as good for beating as pure albumin. Special separators are used for this purpose which may be regulated in such a manner that a desired purity of product is obtained.

If for instance with a method described first (Example I) 1000 liters of whey give 800 liters cleared liquid and 200 liters concentrated albumin, on the second way 1000 liters of whey give 500 liters cleared liquid and 500 liters concentrated liquid. After drying, 35 kg. dry albumin-product result from concentrated liquid which have got besides albumin also milk sugar, milk salts and some other materials.

Instead of separating albumin with separators it is also possible to separate it from solvent by drying it together with all the rest of the solid contents. As mentioned above this drying should be done at a temperature which excludes detrimental influence of heat on colloids of albumin. Working with this method, first the pH value of whey is elevated with a suitable alkali and then, treated in this way, it is concentrated by vacuum vaporisation. Finally the concentrated albumin liquid is dried in a spray-drying-chamber.

In this way it is possible also to get a product good for beating and baking with sufficient albumin content. Of course I can reduce percentage of milk salts and milk sugars by removing milk sugar from whey before or after concentrating for instance by fermenting or crystallisation.

In both of the cases of protein separation mentioned last, the protein content of the product made of whey may be raised by adding soluble casein or white of egg or both. It has been proven especially suitable to add alkali-casein or soluble casein containing calcium or both of these materials or also in connection with materials containing proteins which may improve qualities of product good for beating and baking and may improve stability of albumin foam. Instead of employing alkali, pH value of medium of dispersion may be raised by adding some lime base which may be taken instead of alkali or with alkali. It has proven especially suitable to add calcium hydroxide. Adding these materials, the whole protein of the milk changes over in a product which is good for beating and baking. This method may be used as well for albumin as for casein, also for precipitated milk proteins, acid curds, rennet curds and also with those milk proteins which are still in natural state of colloidal solution.

In order to work with this method for instance milk is creamed and casein of skim milk is precipitated as curds. The pH-value of the casein precipitation partly released from whey is raised up by the influence of lime base, especially of calcium hydroxide until the pH of the originating colloidal solution passes over 7. Simultaneously with calcium hydroxide a volatile alkali may be used. Now milk serum from casein precipitation is treated in the same way after being concentrated by vaporisation at a temperature which prevents any detrimental influence of heat on colloids of albumin. Both solutions obtained in the described manner are mixed then in a fit proportion and dried in a drying-chamber. It is also possible to elevate pH value in a way that first a dry mixture of milk proteins and lime base is made and then water is added to bring both materials in solution and on the desired pH.

When concentrating whey in a vacuum dryer it is necessary to supply a high vacuum in order to obtain low temperatures. The dryer should be absolutely clean as remains of other materials reduce qualities of albumin which are good for beating and baking. Therefore albuminous milk serum and for instance creamed milk cannot be concentrated alternately in the same dryer. But it is possible to concentrate whey and skim milk at the same time in a common solution. The remaining dry substance is good for beating and baking. This method is especially simple and economical and gives a very good gain.

You may do this in different way. For instance it is possible first to raise the pH only of whey and then mix it with skim milk or first mix whey with skim milk, then raise the pH and finally evaporate.

*Example II*

The pH value of 5000 liters of cleaned whey is first fixed somewhat over 7 with calcium hydroxide. After this 5000 liters of skim milk are added. This solution of 10,000 liters is concentrated in a vacuum dryer. Then calcium hydroxide is added until pH value goes up to 10. The solution obtained in this way is dried in a spray-drying-chamber. Before entering the atomiser the solution may be heated up to a degree of heat which is somewhat over the temperature of the atomiser.

It has been found that the pH of dry substance obtained is somewhat below the pH of the solution and fluctuates in a certain degree. This fluctuation depends on the temperature of the process and also on the reaction time in state of solution. As on the other side pH of 9–10 is desirable in order to get a product with best qualities for beating it is necessary to fix pH of solution on 10 in order that may it slide up to 9.

Composition of this solution may be changed and as albumin is of higher value than casein it is desirable to raise percentage of whey of common solution.

I claim:

1. The process of separating albuminous products from whey comprising raising the pH value of whey above 7 to form a precipitate, concentrating the precipitate to a solid content value of 6% to 12% while maintaining the temperature of the liquid below 60° C., and drying the concentrate before the precipitate begins to redissolve.

2. The process of separating albuminous products from whey comprising raising the pH value of whey above 7 to form a precipitate by addition of a dry mixture of milk proteins and lime base, concentrating the precipitate to a solid content value of 6% to 12%, and drying the concentrate.

3. The process of separating albuminous products from whey comprising raising the pH value of whey above 7 without heating to form a precipitate, passing the whey through a separator to concentrate the precipitate to a solid content value between 6 and 12% and spray drying the concentrate.

4. The process of separating albuminous products from whey comprising raising the pH value of whey above 7 without heating to form a precipitate, concentrating the whey in a vacuum evaporator at temperatures below 60° C. to a solid content value between 6% and 12%, and spray drying the concentrate.

5. The process of manufacturing edible albuminous materials comprising treating a body of whey with alkalizing materials to raise the pH value over 7 and form a precipitate, concentrating the precipitate to a solid content value of 6% to 12%, adding soluble casein to the concentrate, and spray drying the mixture.

6. The process of separating albuminous materials from whey and skim milk comprising mixing whey and skim milk, adding alkaline materials to the mixture until the pH value is above 7 to form a precipitate, concentrating the precipitate to a solid content value of 6% to 12%, and drying the precipitate.

7. The process of manufacturing edible albuminous materials comprising treating a body of whey with alkalizing materials to raise the pH value over 7 and form a precipitate, adding skim milk to the treated whey, concentrating the mixture to a solid content value of 6% to 12%, adding alkalizing materials to raise the pH value of the concentrate over 7, and drying the concentrate.

8. The process of making an edible dry albuminous material which consists in transforming the whey solution into an opalescent suspension containing the solid albuminous material in an uncoagulated condition suitable for precipitation in a fine state by adjusting the pH value of the solution to a value over 7 and maintaining the solution alkaline to prevent reversal of the precipitation, concentrating to a solid albuminous content of not more than 12%, and then removing the liquid spray drying to leave a dry albuminous material.

KARL KREMERS.